United States Patent
Batchelor

(10) Patent No.: US 11,173,887 B2
(45) Date of Patent: Nov. 16, 2021

(54) DUAL MASTER CYLINDER BRAKE ASSEMBLY WITH QUICK-FILL FUNCTION

(71) Applicant: Carlisle Industrial Brake & Friction, Solon, OH (US)

(72) Inventor: Mark Batchelor, Newport (GB)

(73) Assignee: Carlisle Industrial Brake & Friction, Solon, OH (US)

( * ) Notice: Subject to any disclaimer, the term of this patent is extended or adjusted under 35 U.S.C. 154(b) by 273 days.

(21) Appl. No.: 16/325,496

(22) PCT Filed: Aug. 17, 2017

(86) PCT No.: PCT/US2017/047314
§ 371 (c)(1),
(2) Date: Feb. 14, 2019

(87) PCT Pub. No.: WO2018/035306
PCT Pub. Date: Feb. 22, 2018

(65) Prior Publication Data
US 2019/0210578 A1  Jul. 11, 2019

Related U.S. Application Data

(60) Provisional application No. 62/376,481, filed on Aug. 18, 2016.

(51) Int. Cl.
*B60T 11/20* (2006.01)
*B60T 11/21* (2006.01)
(Continued)

(52) U.S. Cl.
CPC ............. *B60T 11/203* (2013.01); *B60T 11/10* (2013.01); *B60T 11/16* (2013.01); *B60T 11/20* (2013.01);
(Continued)

(58) Field of Classification Search
CPC ........ B60T 11/203; B60T 11/10; B60T 11/16; B60T 11/20; B60T 11/21; B60T 11/334;
(Continued)

(56) References Cited

U.S. PATENT DOCUMENTS 2,453,852 A * 11/1948 Milster ................... F15B 7/005
60/567
3,937,021 A * 2/1976 Sisco .................... B60T 11/224
60/575

(Continued)

FOREIGN PATENT DOCUMENTS

DE   102013001301 A1   7/2013
EP       2404798 A1    1/2012
(Continued)

OTHER PUBLICATIONS

European Patent Office; Extended Search Report in related European Application No. 17842105.3 dated May 11, 2020; 5 pages.
(Continued)

Primary Examiner — Melanie Torres Williams
(74) Attorney, Agent, or Firm — Michael Best & Friedrich LLP

(57) ABSTRACT

A hydraulic brake assembly (12) includes a housing (24) having first and second side-by-side bores (30), each defining a respective master cylinder assembly. Each master cylinder assembly includes a master cylinder piston (32) slidably movable by actuation of a respective brake pedal (18a, 18b) to and between an active position and an inactive position. A spool (74) slidably disposed within a piston bore (70) of the master cylinder piston (32) is operable in a first mode to direct hydraulic fluid from a quick-fill chamber (62) to a master cylinder chamber (50) at a first pressure upon initial movement of the master cylinder piston (32) from the inactive position toward the active position. The spool (74) is operable in a second mode to direct hydraulic fluid from
(Continued)

the quick-fill chamber (62) to a tank (20) when pressure in the master cylinder chamber (50) reaches a predefined threshold.

26 Claims, 16 Drawing Sheets

(51) Int. Cl.
 B60T 11/224 (2006.01)
 B60T 11/228 (2006.01)
 B60T 11/232 (2006.01)
 B60T 11/16 (2006.01)
 B60T 11/10 (2006.01)

(52) U.S. Cl.
 CPC ............ B60T 11/21 (2013.01); B60T 11/224 (2013.01); B60T 11/228 (2013.01); B60T 11/232 (2013.01); B60T 2201/12 (2013.01)

(58) Field of Classification Search
 CPC .... B60T 11/228; B60T 11/232; B60T 13/142; B60T 13/143; B60T 13/145; B60T 2201/12
 See application file for complete search history.

(56) References Cited

U.S. PATENT DOCUMENTS

| | | | |
|---|---|---|---|
| 4,444,440 A | | 4/1984 | Farr |
| 4,445,334 A | * | 5/1984 | Derrick ................ B60T 11/224 |
| | | | 60/578 |
| 5,788,342 A | | 8/1998 | Noguchi |
| 2004/0070266 A1 | | 4/2004 | Batchelor et al. |
| 2008/0236161 A1 | | 10/2008 | Bass |
| 2011/0185723 A1 | | 8/2011 | Ganzel |

FOREIGN PATENT DOCUMENTS

| | | | | |
|---|---|---|---|---|
| GB | 1144618 A | * | 3/1969 | ............ B60T 11/206 |
| GB | 2129520 A | * | 5/1984 | ............ B60T 11/224 |

OTHER PUBLICATIONS

U.S. Patent and Trademark Office; Search Report and Written Opinion in related International Patent Application No. PCT/US2017/047314 dated Oct. 25, 2017; 10 pages.

* cited by examiner

DUAL MASTER CYLINDER BRAKE ASSEMBLY WITH QUICK-FILL FUNCTION

CROSS-REFERENCE

This application claims the benefit of U.S. Provisional Patent Application Ser. No. 62/376,481, filed Aug. 18, 2016, the disclosure of which is incorporated by reference herein in their entirety.

TECHNICAL FIELD

The present invention relates generally to vehicle brake systems and, more particularly, to an improved boosted brake master cylinder assembly having a quick-fill function.

BACKGROUND

In the design and development of vehicles, there is a continued effort to achieve increased fuel efficiencies, particularly for Class 8 trucks or other industrial vehicles. One strategy of this effort for improved fuel efficiency involves increasing brake running clearances. While these increased running clearances facilitate fuel efficient operation, they also require more hydraulic fluid volume in order to take up the clearances when brakes are applied to slow or stop a vehicle. Thereby requiring more energy devoted to providing additional hydraulic pressure. A need exists for an improved, efficient, and compact brake system that accommodates larger brake running clearances, and which can achieve the take up of these clearances upon activation of the brakes without the need for additional hydraulic power components for pressurizing hydraulic fluid in the system.

SUMMARY

The present invention provides a hydraulic brake assembly with a quick-fill function that takes up any running clearances in the brakes upon initial application of the brakes by a user. After the running clearances have been taken up, continued application of force to the brake pedal by the user actuates the brakes to retard or stop the vehicle. While the invention will be described in connection with certain embodiments, it will be understood that the invention is not limited to these embodiments. On the contrary, the invention includes all alternatives, modifications and equivalents as may be included within the spirit and scope of the present invention.

In one aspect, a hydraulic brake assembly in accordance with the principles of the present disclosure includes a brake assembly housing and first and second housing bores in the brake assembly housing, arranged side-by-side. Each of the first and second bores defines a respective master cylinder assembly, and each master cylinder assembly includes a master cylinder piston slidably disposed in the respective housing bore and movable by actuation of a respective brake pedal to and between an active position and an inactive position. The master cylinder piston has a first diameter and a second diameter. The first diameter cooperates with the housing bore to define a variable volume quick-fill chamber, and the second diameter cooperates with the housing bore to define a variable volume master cylinder chamber.

The master cylinder assembly further includes a piston bore in the master cylinder piston and communicating with the quick-fill chamber. A spool is slidably disposed within the piston bore and is operable in a first mode to direct hydraulic fluid from the quick-fill chamber to the master cylinder chamber and the brakes at a first pressure upon initial movement of the master cylinder piston from the inactive position toward the active position. The hydraulic fluid from the quick-fill chamber takes up any clearance between the friction elements of the brakes. The spool is operable in a second mode to direct hydraulic fluid from the quick-fill chamber to a tank when pressure in the master cylinder chamber reaches a predefined threshold, whereafter continued movement of the master cylinder piston toward the active position provides hydraulic fluid to the friction elements of the brakes at a second pressure higher than the first pressure.

The above and other objects and advantages of the present invention will be apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1A:
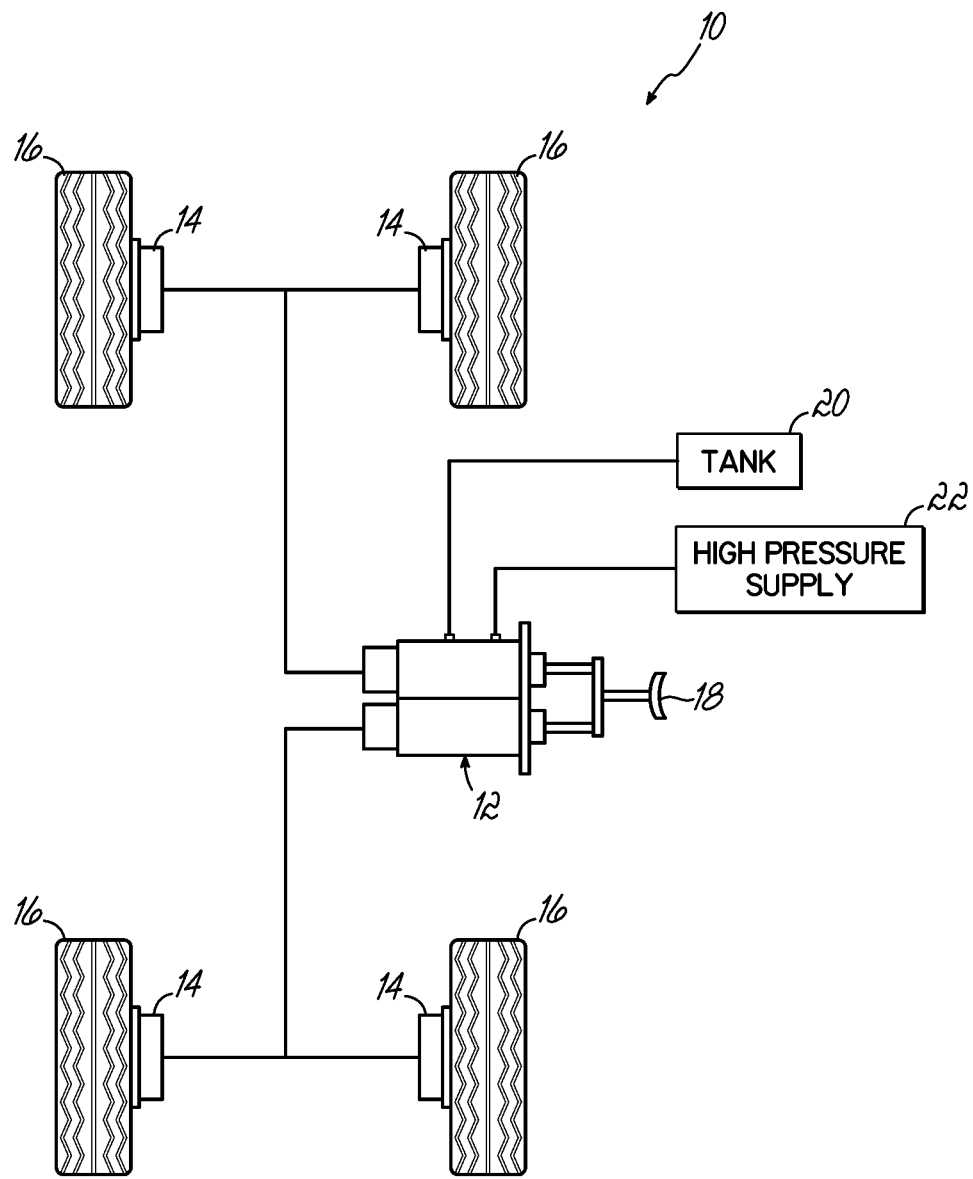
FIG. 1A is a schematic illustration of a vehicle brake system including an exemplary brake assembly in accordance with the principles of the present disclosure.

FIG. 1A schematically illustrates an embodiment of a vehicle brake system 10 including an exemplary hydraulic brake assembly 12 in accordance with the principles of the present invention. The hydraulic brake assembly 12 provides pressurized hydraulic fluid to brake friction elements 14 associated with each of the wheels 16 of the vehicle to thereby retard or stop the rotational movement of the wheels 16 when brake pedal 18 is actuated by a user. In the embodiment shown, a single brake pedal 18 actuates both cylinders of the brake assembly 12, as will be described below. The brake assembly 12 communicates with a supply of hydraulic fluid provided in a tank 20, and a high pressure supply of hydraulic fluid 22. The brake system may further include a pump, a hydraulic accumulator, or other suitable device for pressurizing the hydraulic fluid.

Figure 1B:
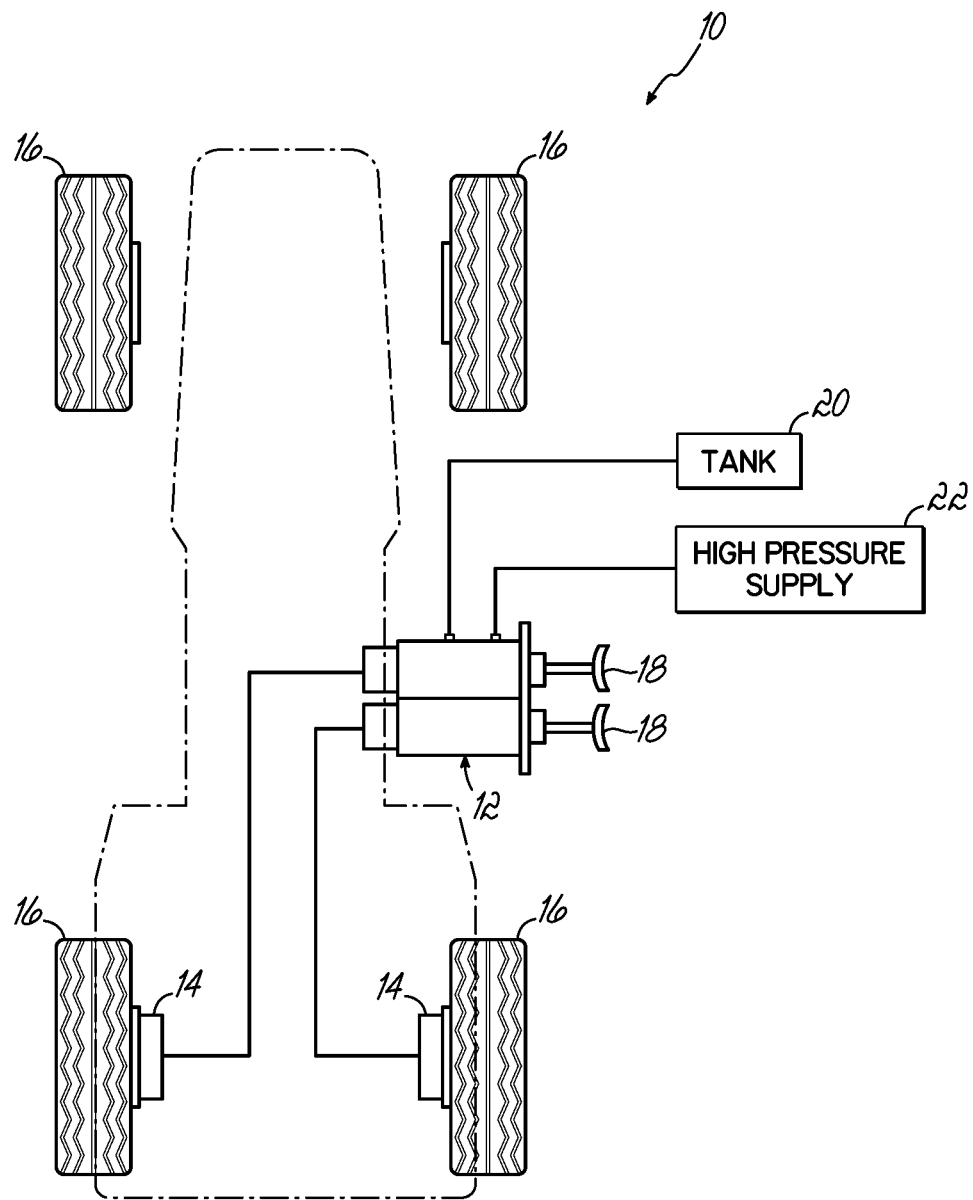
FIG. 1B is a schematic illustration of another embodiment of vehicle brake system including an exemplary brake assembly in accordance with the principles of the present disclosure.

FIG. 1B schematically illustrates another embodiment of a vehicle brake system 10a including an exemplary hydraulic brake assembly 12 in accordance with the principles of the present invention. In this embodiment, individual brake pedals 18a, 18b may be depressed by a user to separately actuate the cylinders of the brake assembly 12, and each cylinder communicates with one of the brake friction elements 14 of the rear wheels 16 of a vehicle, for example. Such a configuration may be useful for agricultural tractors or other applications wherein individual actuation of the cylinders is desired, for example, to facilitate turning of the vehicle.

Figure 2:
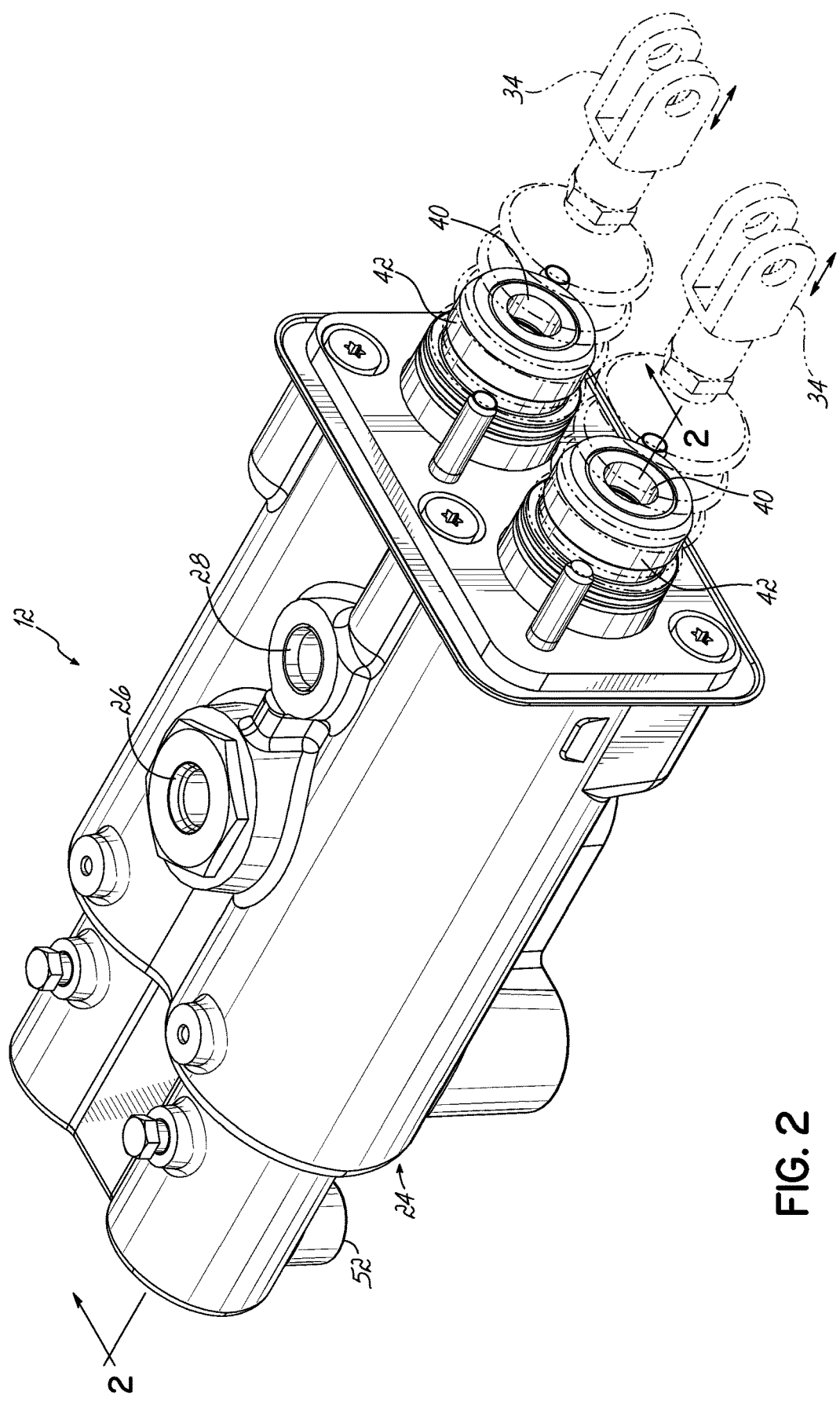
FIG. 2 is a perspective view of an exemplary dual master cylinder brake assembly in accordance with the principles of the present disclosure.
Figure 3:
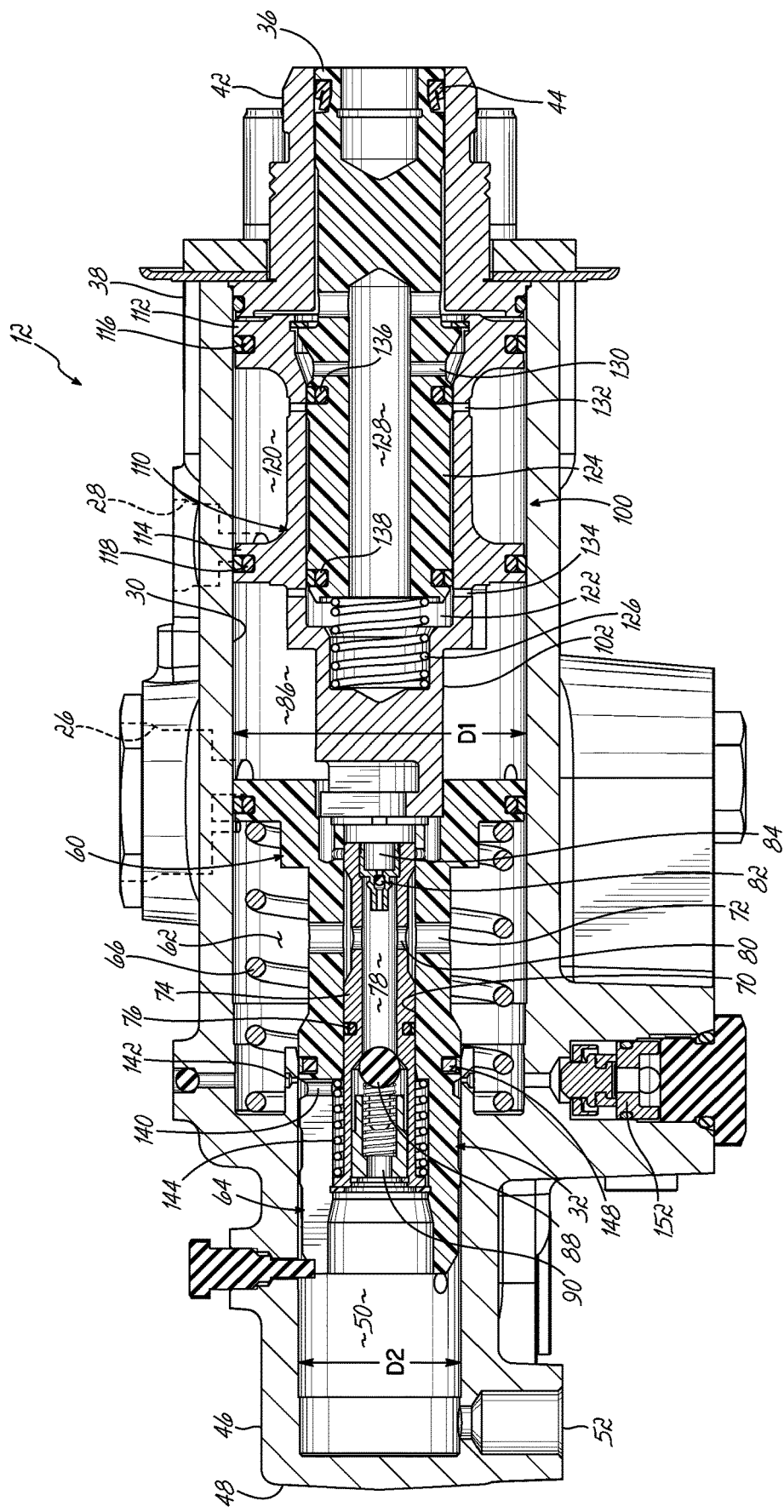
FIG. 3 is a cross-sectional view of the brake assembly of FIG. 1, taken along line 2-2.

Referring now to FIGS. 2 and 3, the exemplary brake assembly 12 comprises a brake assembly housing 24 enclosing the components of the brake assembly, including one or more master cylinders, as will described in more detail below. In the embodiment shown, the brake assembly 12 includes first and second master cylinders arranged side-by-side to define a dual master cylinder brake assembly. It will be appreciated, however, that various features of the inventive brake assembly described herein may be utilized in various other brake configurations. As non-limiting examples, various features of the inventive brake assembly described herein may be used in a tandem arrangement of master cylinders, or in a single master cylinder arrangement. The brake assembly 12 communicates with the supply of hydraulic fluid provided in tank 20 through a tank port 26, and communicates with the supply of high pressure fluid 22 through a boost port 28.

First and second longitudinally extending housing bores are formed in the brake assembly housing in a side-by-side arrangement to define the dual master cylinder arrangement (only the first housing bore 30 is illustrated in FIG. 3). Because each master cylinder assembly of the brake assembly is constructed in the same manner, only one of the master cylinder arrangements will be described herein. Each master cylinder assembly includes a master cylinder piston 32 slidably disposed within the respective housing bore 30 for movement by actuation of brake pedal 18 to and between an inactive position (depicted in FIG. 3) and an active position (depicted in FIG. 4G), as will be described more fully below. In the alternative embodiment depicted in FIG. 1B, each master cylinder piston 32 may be individually moved by actuation of the respective brake pedals 18a, 18b, as generally discussed above.

Brake pedal 18 is coupled by brake rods 34 to a respective input rod 36 at a first, open end 38 of the brake housing 24. Each input rod 36 is slidably received in an aperture 40 of an input journal 42 at the first end 38 of the brake housing 24, and is sealed by a circumferentially extending seal 44 disposed between the input rod 36 and the inner diameter of the input journal 42. A second end 46 of the housing 24 is closed by an end wall 48, and cooperates with the master cylinder piston 32 to define a master cylinder chamber 50 which communicates with the brake friction elements 14 through respective brake ports 52 at the second end 46 of the housing 24.

With continued reference to FIG. 3, the master cylinder piston 32 comprises a first piston portion 60 having a first diameter D1 that cooperates with a corresponding inner diameter of the housing bore 30 to define a quick-fill chamber 62. The master cylinder piston 32 further includes a second piston portion 64 having a second diameter D2, smaller than the first diameter D1, and cooperating with a corresponding reduced inner diameter portion of the housing bore 30 to define the master cylinder chamber 50 between the second piston portion 64 and the end wall 48 of the housing 24. A biasing element, shown herein in the form of a master cylinder spring 66, is disposed in the quick-fill chamber 62 and biases the master cylinder piston 32 in a direction toward the first end 38 of the housing 24 corresponding to the inactive position of the master cylinder piston 32 when no external force is applied to the brake pedal 18 to actuate the brakes.

A longitudinally extending piston bore 70 is provided in the master cylinder piston 32 and communicates with the quick-fill chamber 62 through radially extending passages 72 in the master cylinder piston 32. A spool 74 is slidably disposed within the piston bore 70 and is sealed against the inner diameter of the piston bore 70 by one or more circumferentially extending seals 76. A longitudinally extending central passage 78 provided in the spool 74 communicates with the quick-fill chamber 62 through the radially extending passages 72 of the master cylinder piston 32 and corresponding radially extending passages 80 in the spool 74. A first check valve 82 may be provided at a first end 84 of the central passage 78 to control the flow of hydraulic fluid back to a recuperation chamber 86, as will be described in more detail below. A second check valve 88 may be provided at a second end 90 of the central passage 78 through the spool 74 to control the flow of hydraulic fluid through the central passage 78 for communication with the master cylinder chamber 50.

The spool 74 is operable in a first mode to direct hydraulic fluid from the quick-fill chamber 62 through the second check valve 88 and into the master cylinder chamber 50 at a first pressure upon an initial movement of the master cylinder piston 32 from the inactive position toward the active position, such that any clearance between the friction elements 14 of the brakes is taken up. The spool 74 is also operable in a second mode to direct hydraulic fluid from the quick-fill chamber 62 to the tank 20 when pressure in the master cylinder chamber 50 reaches a predefined threshold. The predefined threshold may be set by preloading a spring 144 (described further below). When the pressure in the master cylinder chamber 50 reaches the predefined threshold, continued movement of the master cylinder piston 32 toward the active position provides hydraulic fluid to the friction elements 14 of the brakes at a second pressure that is higher than the first pressure for actuation of the brakes. In the first mode of operation the second check valve permits the passage of hydraulic fluid to the master cylinder chamber 50, and the first check valve 82 prevents hydraulic fluid from passing to the recuperation chamber 86.

The brake assembly may further include a booster assembly 100 operatively coupled with the master cylinder piston 32 by a piston extension 102 to provide a boost force to the master cylinder piston 32 when the associated brake pedal 18 is actuated by a user. In the embodiment shown, the booster assembly 100 includes a boost piston 110 slidably disposed within the housing bore 30. First and second lands 112, 114 are provided on the boost piston 110, with first and second circumferential seals 116, 118 sealingly engaging the first inner diameter of the housing bore 30. The first and second lands 112, 114 of the boost piston 110 cooperate with the housing bore 30 to define a boost chamber 120 therebetween. The boost chamber 120 communicates with the high pressure supply 22 through the boost port 28. The second land 114 of the boost piston 110 cooperates with the first master cylinder piston portion 60 to define the recuperation chamber 86 between the master cylinder piston 32 and the second land 114.

A longitudinally extending boost bore 122 is provided in the boost piston 110, and a control valve 124 is slidably disposed within the boost bore 122. The control valve 124 is slidably moveable by actuation of the associated brake pedal 18 to and from a first position and a second position. A boost spring 126 provided at a distal end of the boost bore 122 biases the control valve 124 in a direction toward the first end 38 of the housing 24, corresponding with the first position of the control valve 124. An elongate passage 128 and radially extending passages 130 are provided in the control valve 124. First and second radially extending passages 132, 134 are provided in the boost piston 110 for communication between the boost chamber 120, the boost bore 122 and the recuperation chamber 86, as will be described below. First and second circumferential seals 136, 138 disposed between the control valve 124 and the boost bore 122 operate to open and close the radially extending passages 132, 134 in the boost piston 110 to control the flow of hydraulic fluid therethrough as the control valve 124 moves between the first and second positions.

Figure 4A:
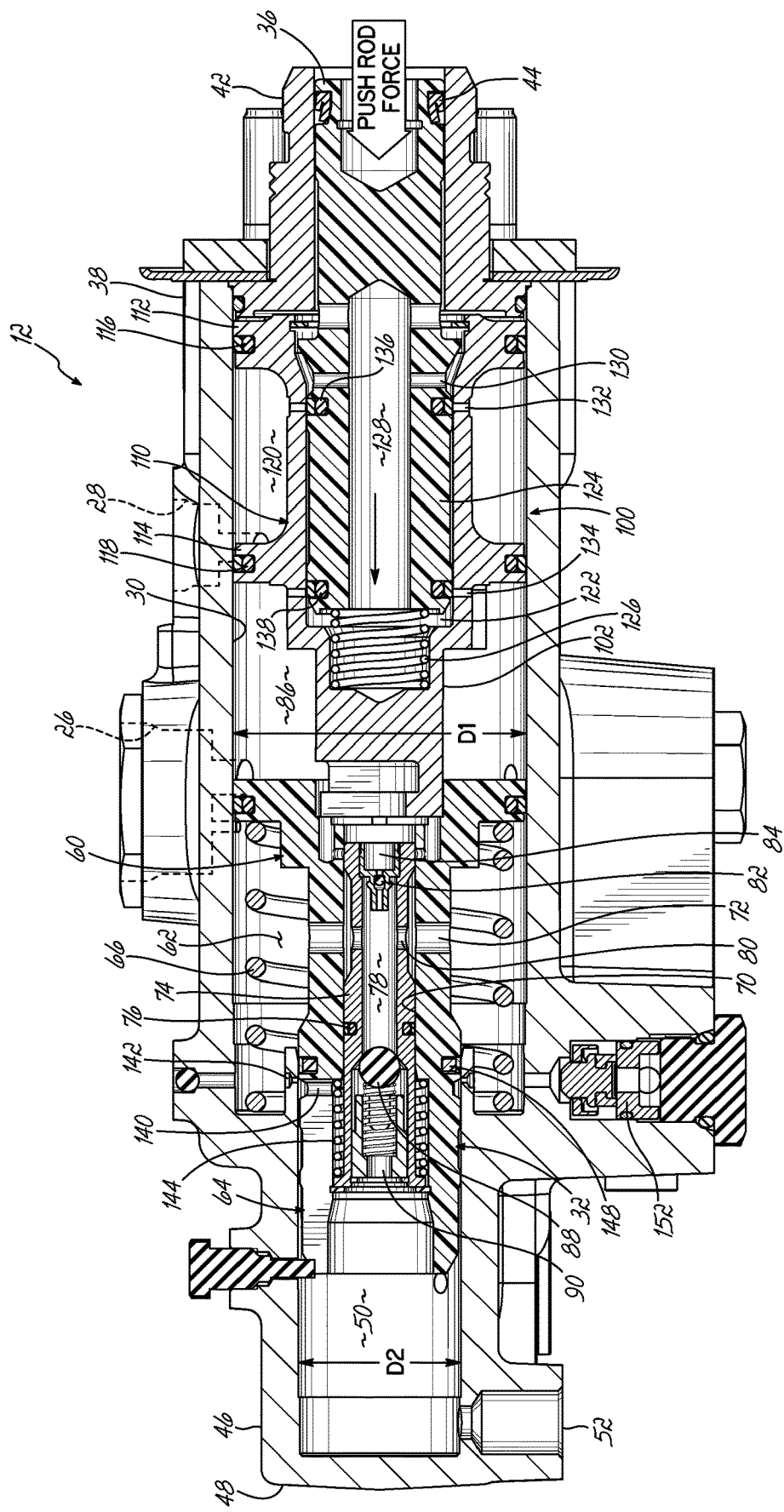
FIGS. 4A-4L are cross-sectional views of the brake assembly of FIG. 2, similar to FIG. 3, and illustrating operation of the brake assembly.
Figure 4B:
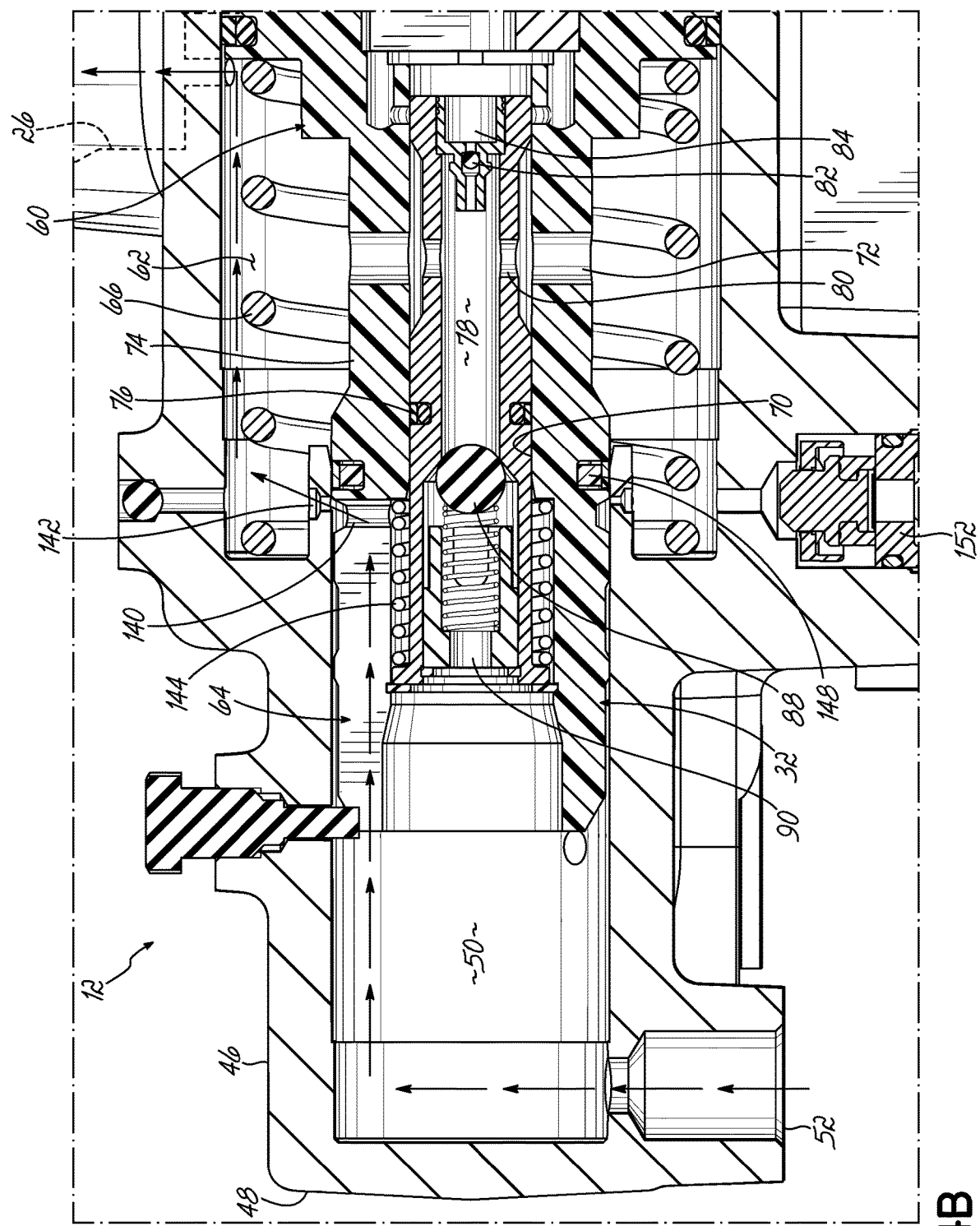

With continued reference to FIG. 3, and referring further to FIGS. 4A-4L, operation of the brake assembly 12 will now be described. FIG. 3 depicts a cross-section of the exemplary brake assembly wherein no pressure is applied to the brake pedal 18 by a user, and the master cylinder piston 32 is in the inactive position, biased by the master cylinder spring 66 in a direction fully toward the first end 38 of the brake assembly housing 24. In this position, the first radial passages 132 in the boost piston 110 are closed off by the control valve 124, the recuperation chamber 86 is in communication with the tank 20 through the tank port 26, and the second radial passages 134 in the boost piston 110 are open so that hydraulic fluid may pass between boost bore 122 and the recuperation chamber 86. As pressure is applied to the brake pedal 18 by a user, the input rod 36 is moved in a direction toward the second end 46 of the brake assembly housing 24, as depicted in FIG. 4A. Movement of the input rod 36 causes the control valve 124 to move in a direction toward the second end 46 of the brake assembly housing 24, compressing the boost spring 126. Any air that may be trapped within the booster or the brake system may escape through one or more bleed passages 140, 142 formed in the master cylinder piston 32 and the brake assembly housing 24 in a direction toward the tank port 26 as generally depicted by arrows in FIG. 4B.

Figure 4C:
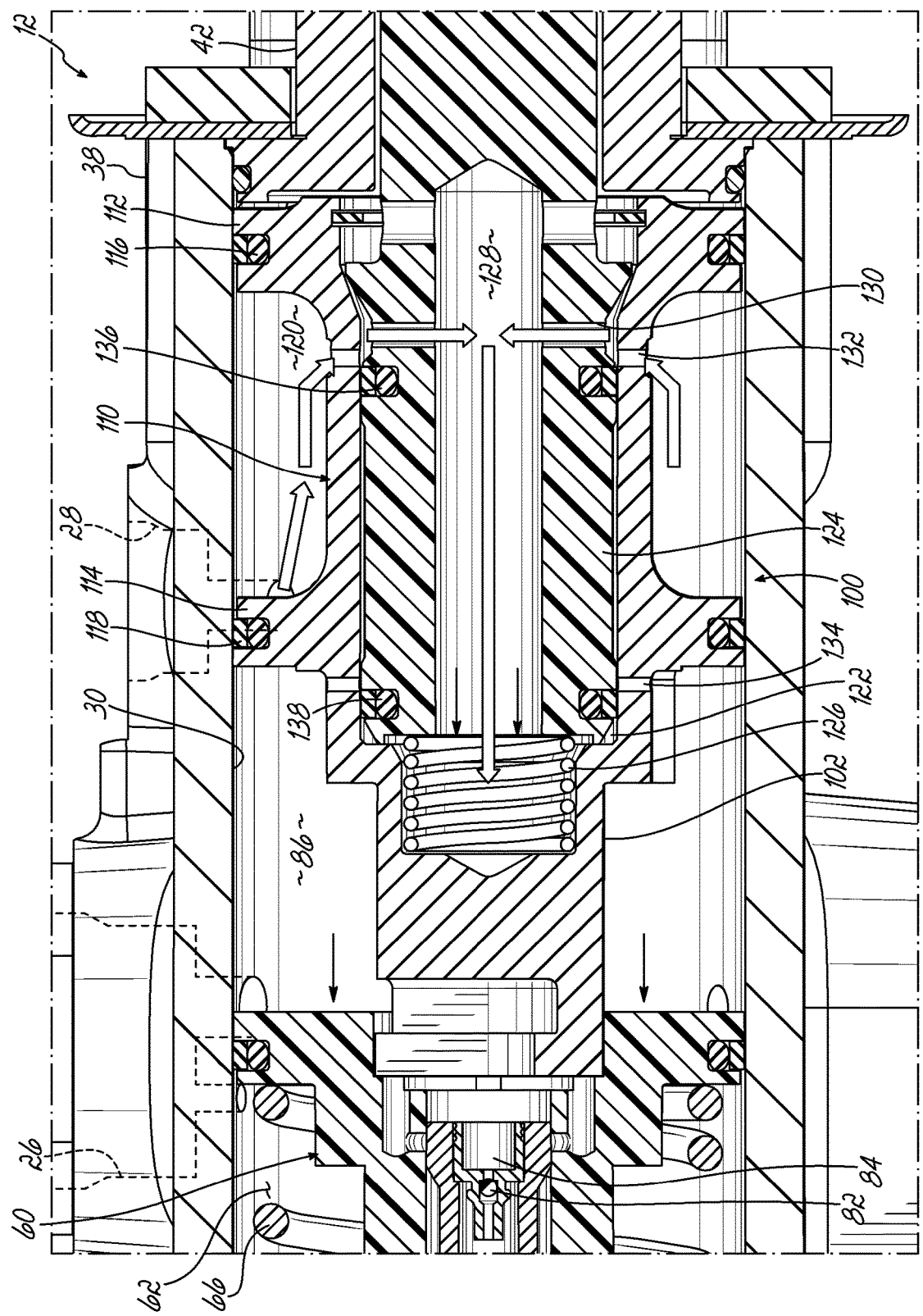
Figure 4D:
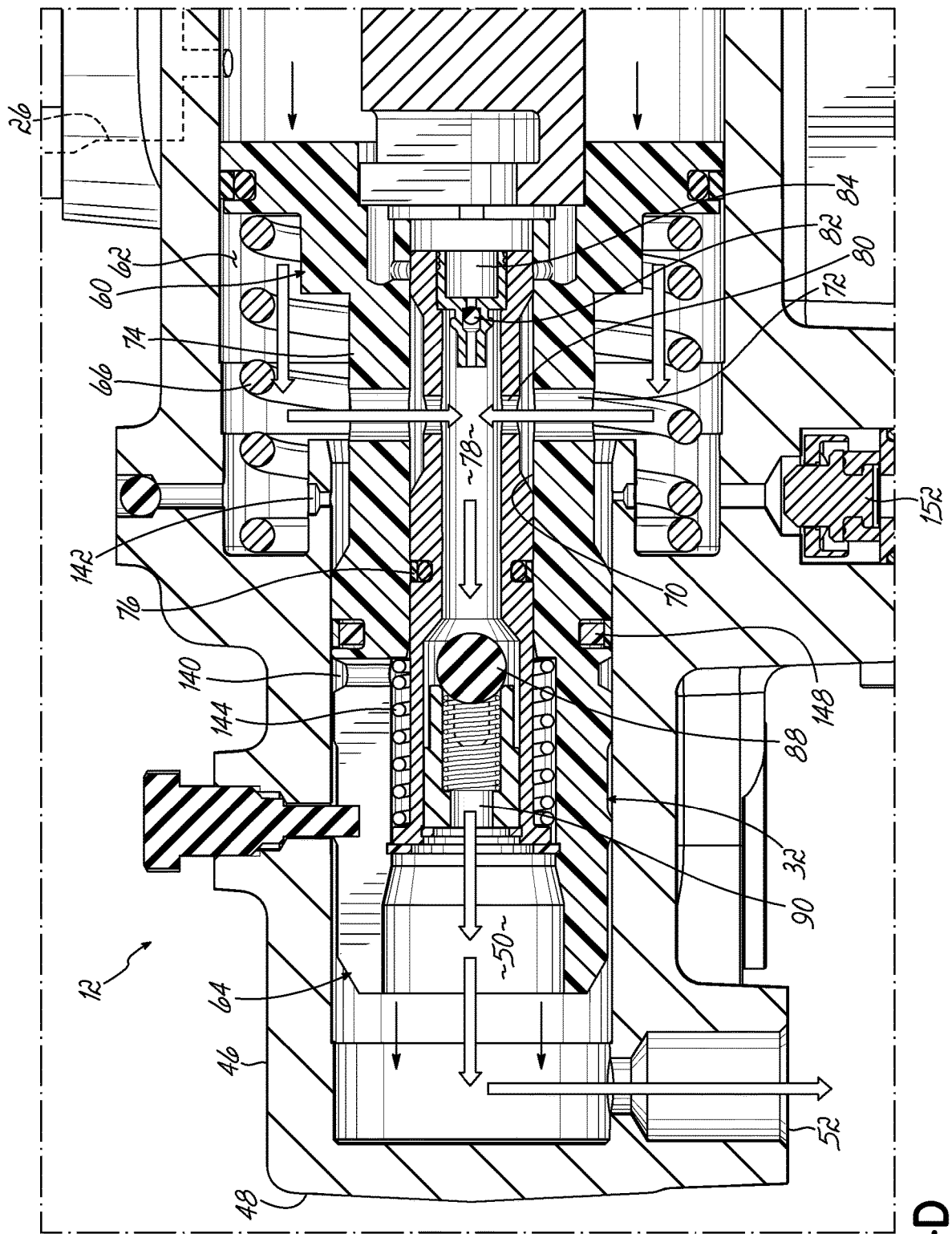

As the brake pedal 18 is further depressed, the input rod 36 continues to move the control valve 124 toward the second end 46 of the brake housing 24, further compressing the boost spring 126 until the first radially extending passages 132 in the boost piston 110 are uncovered by the first circumferential seal 136 on the control valve 124, thereby establishing fluid communication between the boost chamber 120 and the boost bore 122 through the first radially extending passages 132 in the boost piston 110, the radially extending passages 130 in the control valve 124, and the elongate passage 128 in the control valve 124. At the same time, the second circumferential seal 138 on the control valve 124 closes off the second radially extending passages 134 in the boost piston 110, thereby preventing fluid communication between the boost bore 122 and the recuperation chamber 86, as depicted in FIG. 4C. The increased pressure within the boost bore provides a boost force that facilitates movement of the master cylinder piston 32 in a direction toward the second end 46 of the brake assembly housing 24, as depicted in FIG. 4D. The boost force is proportional to the force applied to the input rod 36 by the user's foot on pedal 18, multiplied by the boost ratio. In the embodiment shown, the boost ratio is the square of the ratio of the diameter D1 of the first piston portion 60 to the diameter of the aperture 40.

Figure 4E:
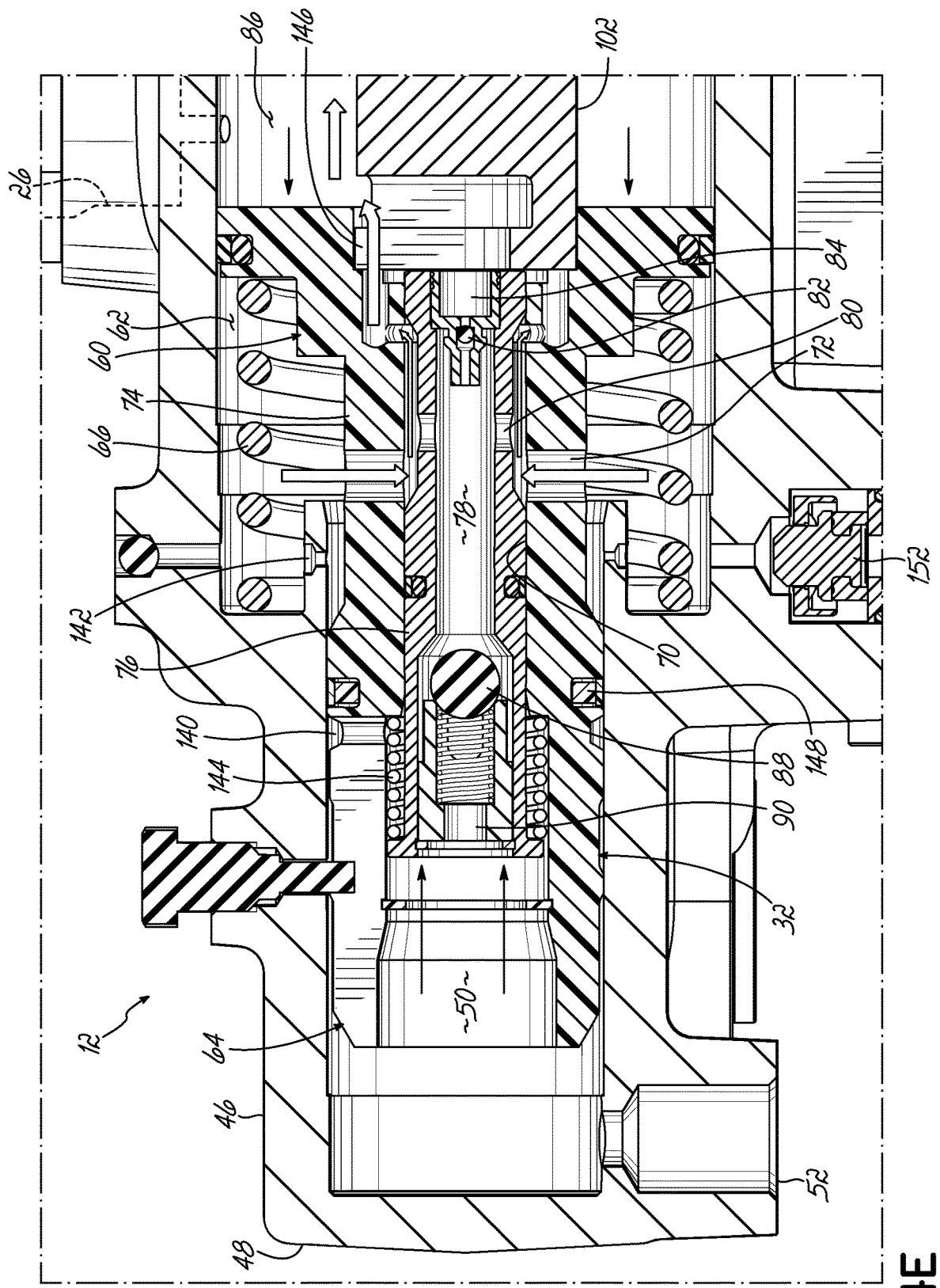

With continued reference to FIG. 4D, movement of the master cylinder piston 32 compresses the master cylinder spring 66 and reduces the volume of the quick-fill chamber 62, thereby forcing hydraulic fluid through the radially extending passages 72, 80 in the master cylinder piston 32 and the spool 74 into the central passage 78 of the spool 74. The hydraulic fluid then flows through the second check valve 88 and into the master cylinder chamber 50 at the second end 46 of the brake assembly housing 24 for communication to the brake friction elements 14 via the brake port 52. The relatively large volume of hydraulic fluid forced from the quick-fill chamber 62 through the master cylinder chamber 50 and toward the brake friction elements 14 quickly takes up any running clearance between the friction elements 14. As hydraulic fluid is forced from the quick-fill chamber 62 into the master cylinder chamber 50, pressure begins to build in the master cylinder chamber 50. As this pressure builds, fluid flow back through the central passage 78 of the spool 74 is prevented by the second check valve 88, and the spool biasing element, shown herein in the form of a spring 144, begins to compress, whereby the spool 74 is moved relative to the master cylinder piston 32 in a direction toward the first end 38 of the brake assembly housing 24, as depicted in FIG. 4E.

Figure 4F:
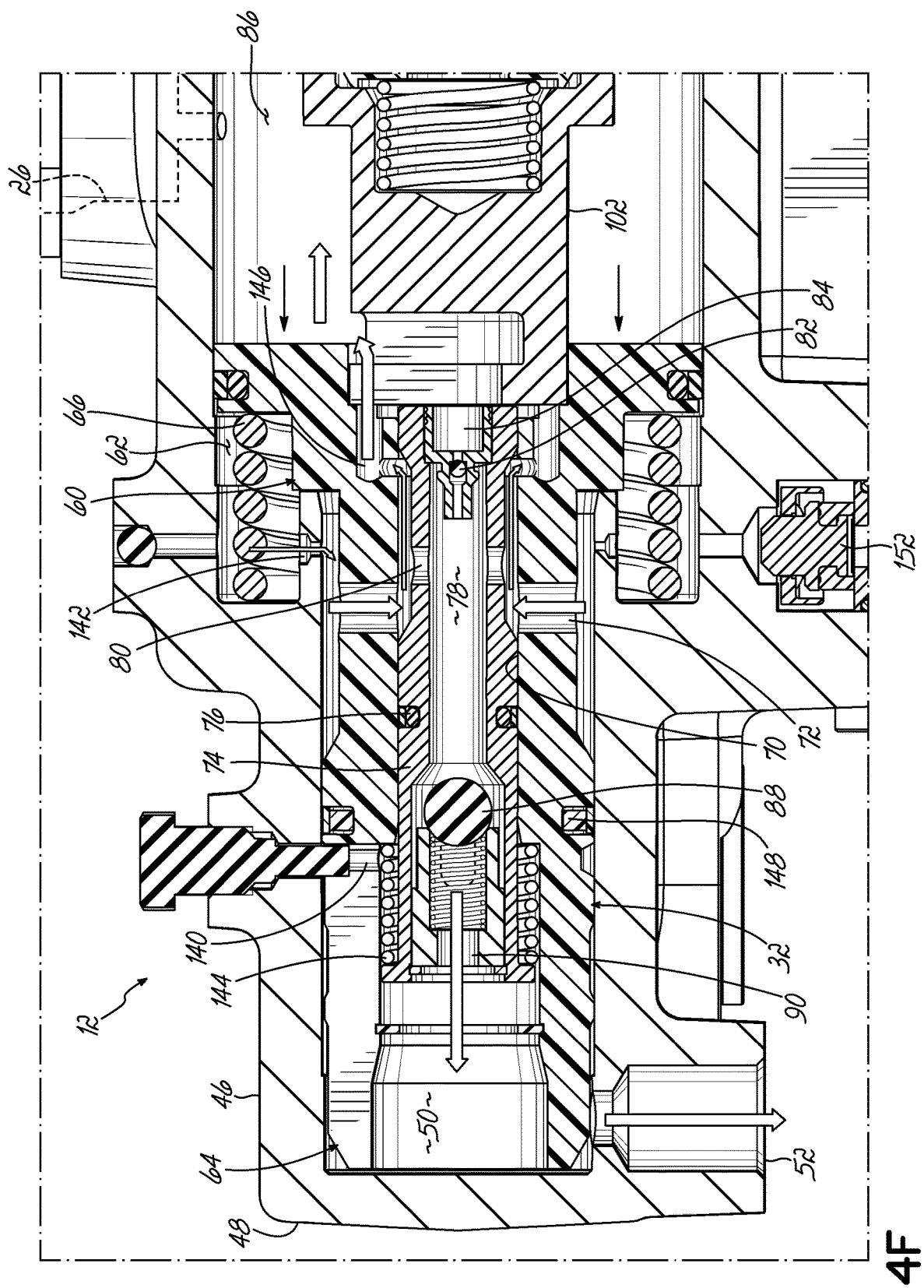
Figure 4G:
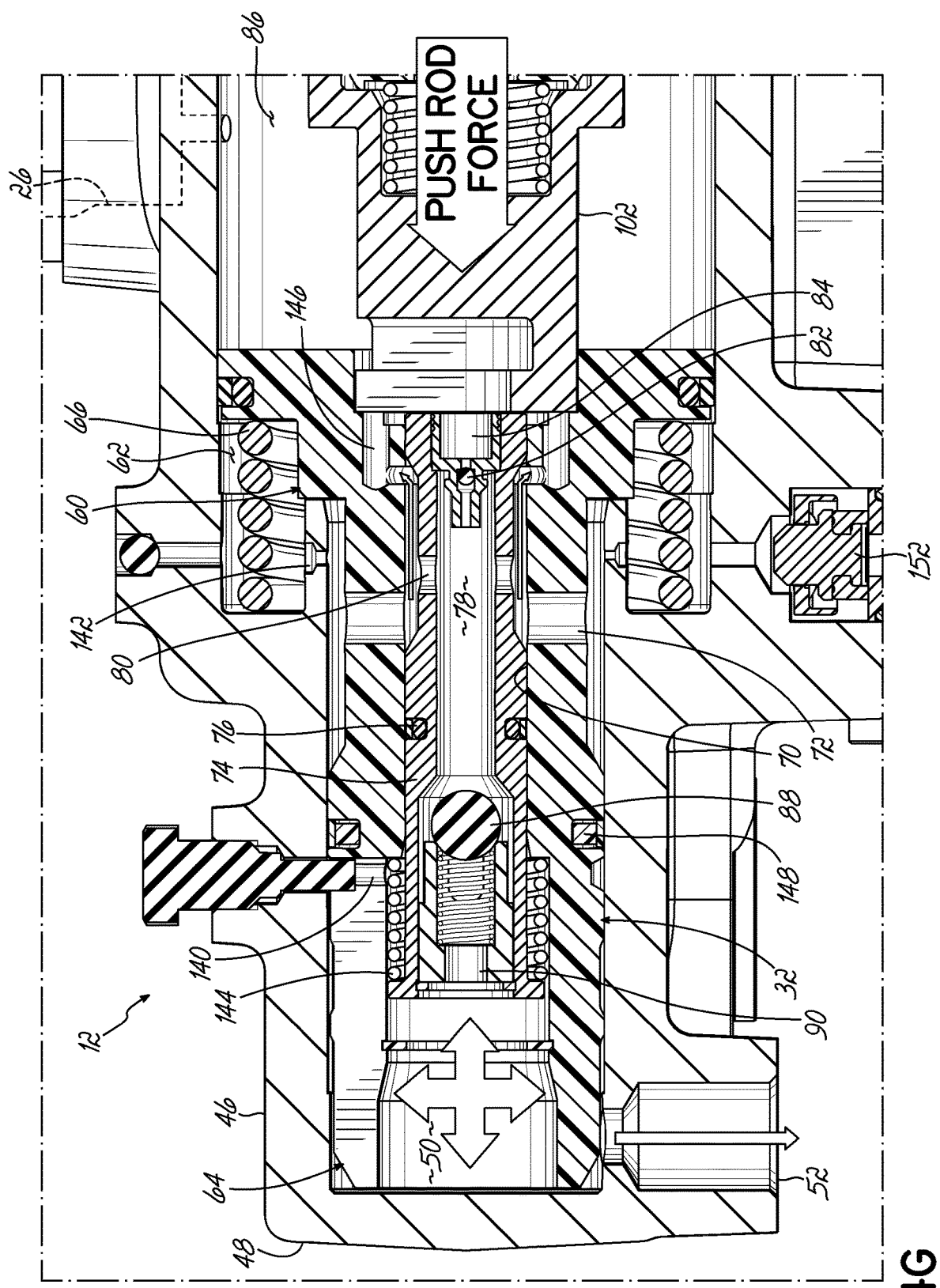

As the spool 74 reaches its limit of travel in the direction of the first end 38 of the brake cylinder housing 24, fluid passages 146 between the piston bore 78 and the recuperation chamber 86 are opened, whereby further hydraulic fluid from the quick-fill chamber 62 is now directed to the recuperation chamber 86 for communication with the tank 20 through the tank port 26 in the second mode of operation of the spool 74, thereby ceasing the quick-fill function of the brake assembly 12. With continued pressure applied to the brake pedal 18, the boost piston 110 and master cylinder piston 32 continue to move in a direction toward the second end 46 of the brake assembly housing 24, wherein the smaller diameter of the second portion 64 of the master cylinder piston 32 forces an additional volume of hydraulic fluid to the brake friction elements 14 from the master cylinder chamber 50 at a pressure higher than the first pressure, as generally depicted in FIG. 4F. The higher pressure if the hydraulic fluid causes the friction elements 14 of the brakes to be activated for retarding and/or stopping the vehicle. The pressure of the hydraulic fluid to the brakes will be maintained while the user's foot remains on the brake pedal 18, as generally depicted in FIG. 4G.

Figure 4H:
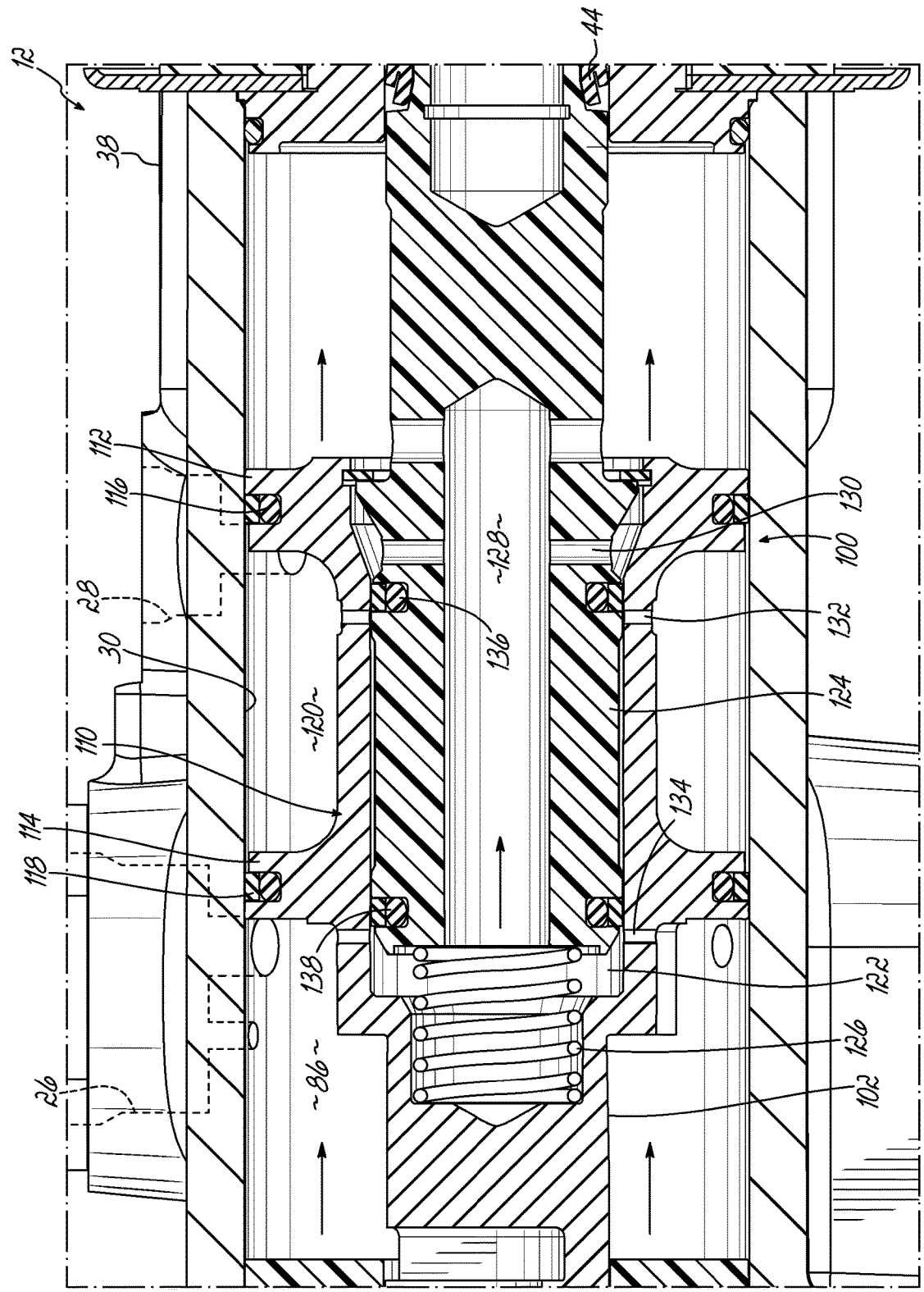
Figure 4I:
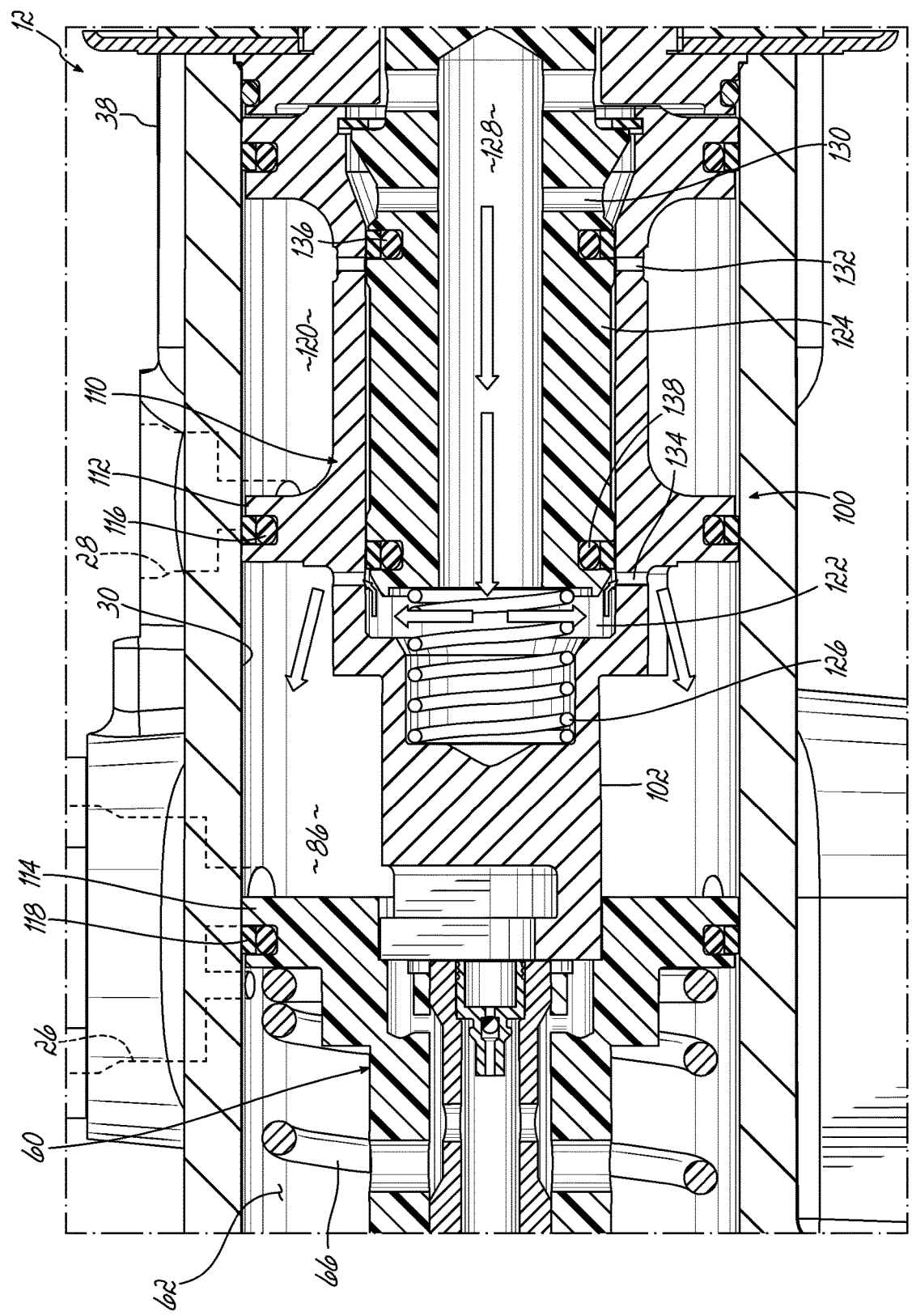
Figure 4J:
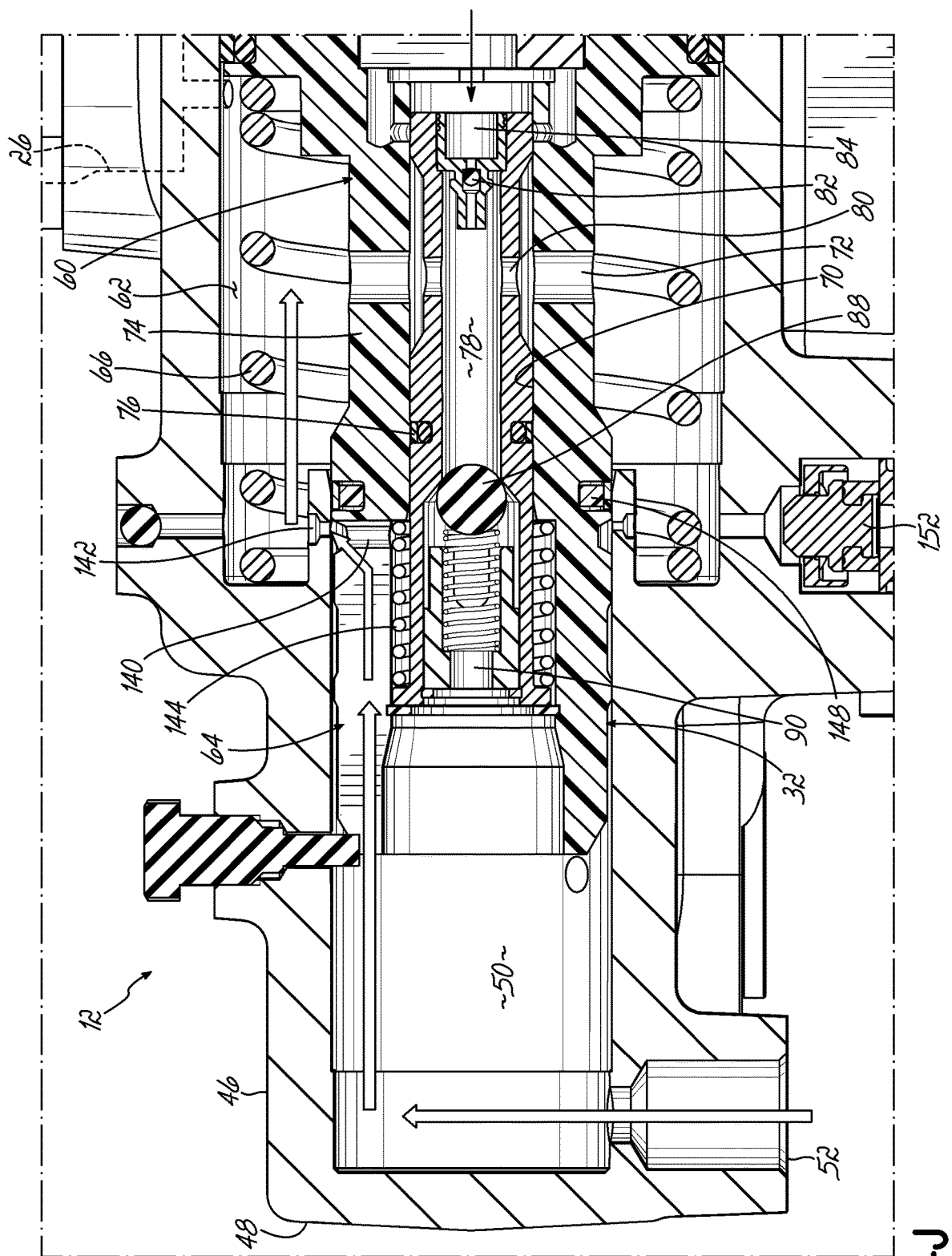

Referring now to FIG. 4H, operation of the brake assembly 12 to release the brakes will now be described. As the user releases pressure on the brake pedal 18, the boost spring 126 biases the control valve 124 in the direction of the first end 38 of the brake assembly housing 24. The first circumferential seal 136 on the control valve 124 closes off the radially extending passages 132 between the elongate passage 128 of the control valve 124 and the boost chamber 120, and the second circumferential 138 seal moves to open the radially extending passages 134 between the boost bore 122 and the recuperation chamber 86, whereby hydraulic fluid in the central passage 128 may flow into the recuperation chamber 86 communicating with the tank 20, as depicted in FIG. 4I. As the pressure in the boost bore 122 is reduced, the boost force is removed and the master cylinder spring 66 begins to move the master cylinder piston 32 in the direction of the first end 38 of the brake assembly housing 24, back toward the inactive position of the master cylinder piston 32. Movement of the master cylinder piston 32 toward the inactive position moves circumferentially extending seals 148 on the master cylinder piston 32 to undercover the bleed passage 140, thereby facilitating the flow of hydraulic fluid from the brakes and the master cylinder chamber 50 in the direction of the quick-fill chamber 62 as the quick-fill chamber volume increases, as illustrated in FIG. 4J.

Figure 4K:
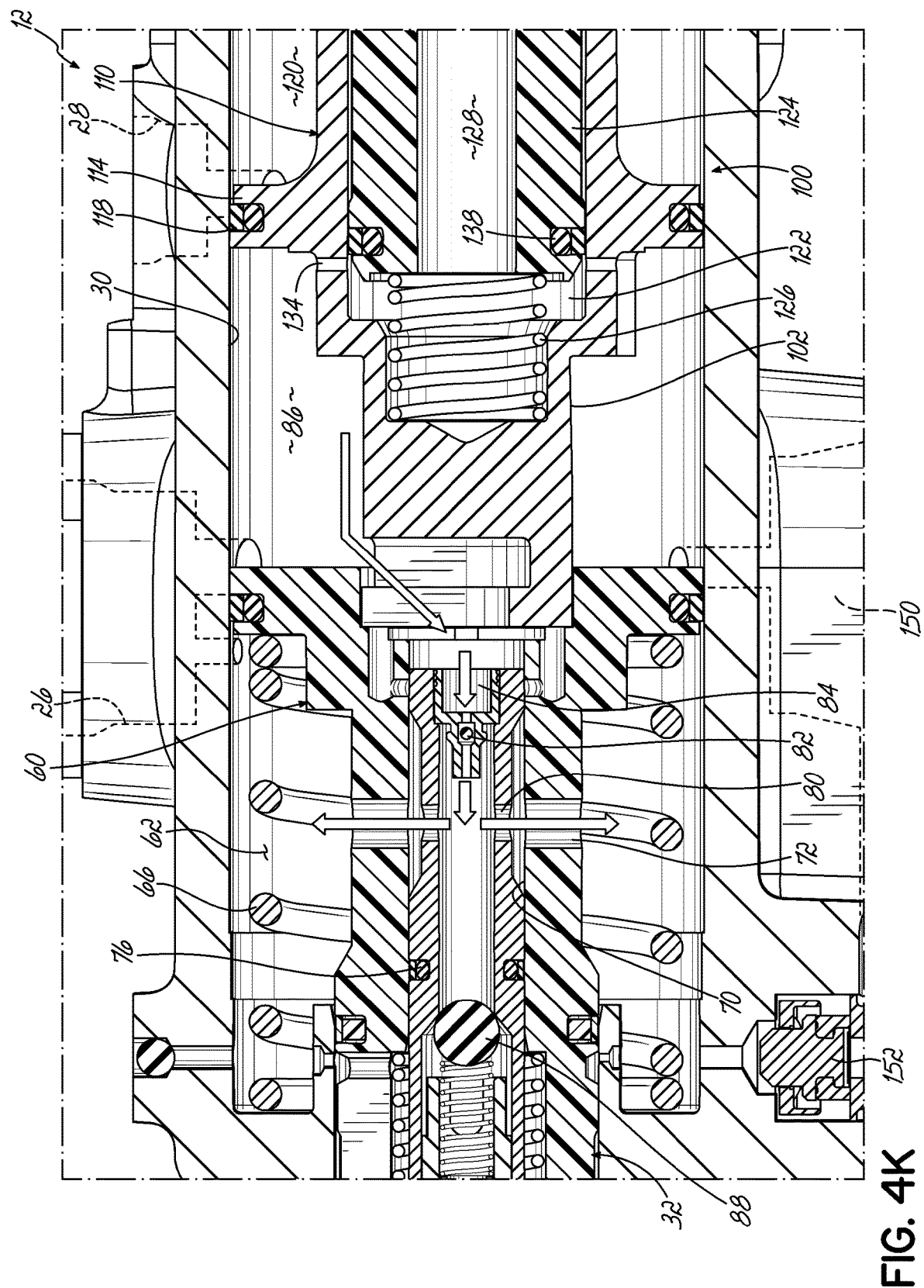

As the pressure in the master cylinder chamber 50 reduces, the spool spring 144 moves the spool 74 relative to the master cylinder piston 32 in a direction toward the second end 46 of the brake assembly housing 24. As the master cylinder piston 32 moves toward the first end 38 of the brake assembly housing 24 and the volume of the quick-fill chamber 62 is increased, hydraulic fluid flows from the recuperation chamber 86 through the extension piston 102 and the first check valve 82 into the central passage 78 of the spool 74. Thereafter, hydraulic fluid flows through the radially extending passages 80, 72 in the spool 74 and the master cylinder piston 32 into the quick-fill chamber 62, as depicted in FIG. 4K.

Figure 4L:
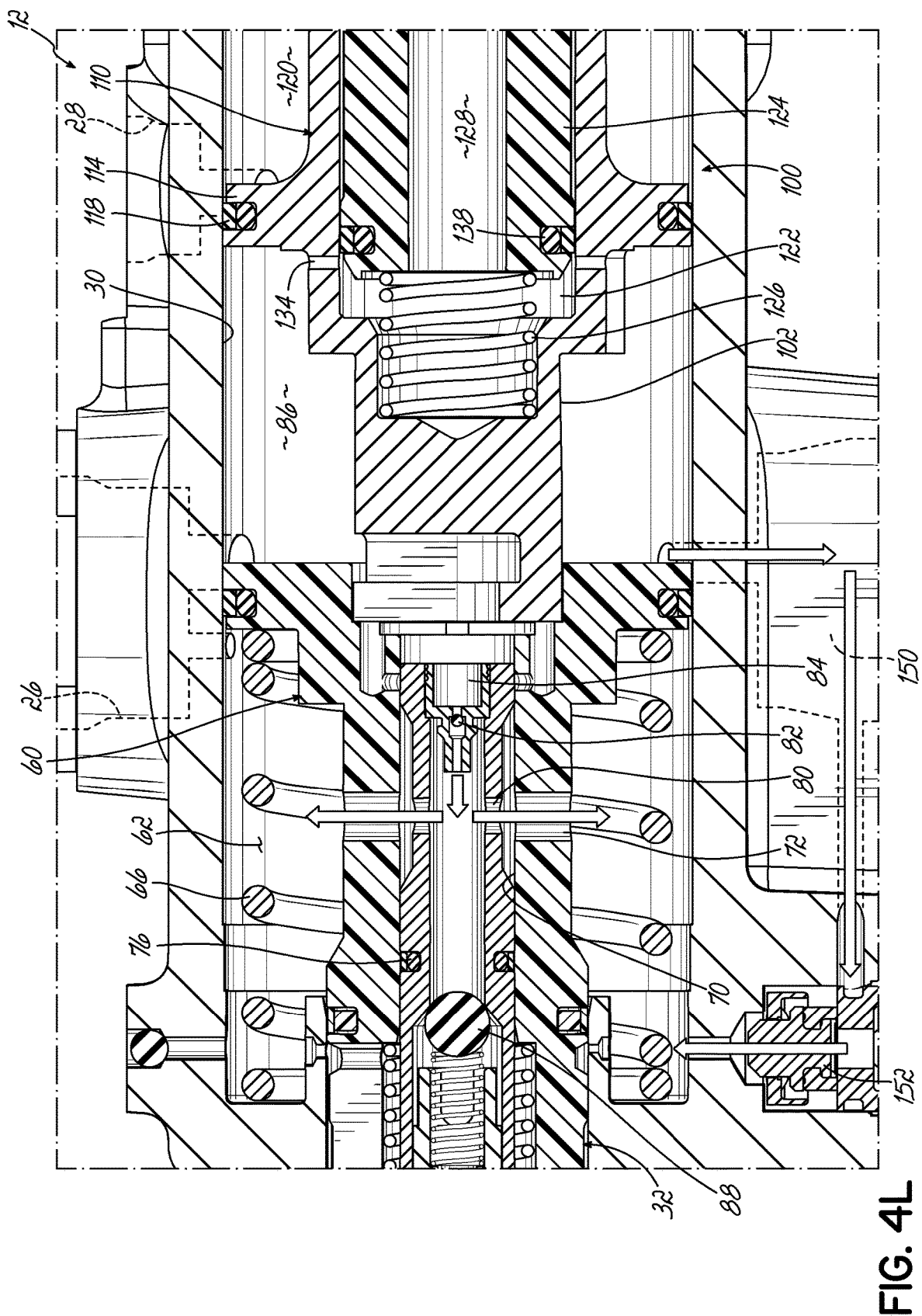

Additional hydraulic fluid may be directed from the recuperation chamber 86 through passages 150 in the brake assembly housing 24 and recuperation valves 152 positioned below the bores 30 in the brake assembly housing 24, as illustrated in FIG. 4L. With the master cylinder piston 32 and boost piston 110 in their original positions as depicted in FIG. 2, the brake assembly 12 is in the inactive condition and ready for further application of braking forces as described above.

While the present invention has been illustrated by a description of various embodiments, and while these embodiments have been described in particular detail, the description is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A brake assembly with brake elements for stopping the wheels of a vehicle and a supply of hydraulic fluid for the brake assembly, the brake assembly including a master cylinder assembly comprising:
    a housing and at least one housing bore in the housing, the housing bore configured for communication with a supply of hydraulic fluid;
    a master cylinder piston slidably disposed in the at least one housing bore and movable by actuation of a brake pedal between an active position and an inactive position;
    the master cylinder piston having a first diameter and a second diameter;
    the first diameter cooperating with the housing bore to define a variable volume quick-fill chamber,
    the second diameter cooperating with the housing bore to define a variable volume master cylinder chamber,
    a biasing element coupled between the housing bore and the first diameter of the master cylinder piston for biasing the master cylinder piston to the inactive position;
    the master cylinder piston including a piston bore communicating with the quick-fill chamber, and a spool slidably disposed within the piston bore,
    the spool operable in a first mode to direct hydraulic fluid from the quick-fill chamber to the master cylinder chamber and the brake elements at a first pressure upon initial movement of the master cylinder piston from the inactive position toward the active position for taking up clearance between the brake elements;
    the spool operable in a second mode, upon further movement of the master cylinder piston, to direct hydraulic fluid from the quick-fill chamber to the supply of hydraulic fluid when pressure in the master cylinder chamber reaches a predefined threshold;
    continued movement of the master cylinder piston toward the active position providing hydraulic fluid to the brake elements at a second pressure higher than the first pressure.

2. The brake assembly of claim 1, further comprising a first check valve and a second check valve cooperating with the spool and directing a flow of hydraulic fluid in the spool between a supply of hydraulic fluid and the master cylinder chamber.

3. The brake assembly of claim 2, the second check valve controlling the passage of hydraulic fluid from the quick-fill chamber to the master cylinder chamber in the first mode, and the first check valve controlling the passage of hydraulic fluid between the quick-fill chamber back and the supply when the master cylinder moves to the inactive position.

4. The brake assembly of claim 1 further comprising a biasing element cooperating with the spool, the biasing element biasing the spool within the piston bore toward a position associated with the first mode of operation.

5. The brake assembly of claim 1, wherein the first diameter is greater than the second diameter.

6. The brake assembly of claim 3 further comprising a recuperation chamber formed in the at least one housing bore and in communication with the supply of hydraulic fluid, the first check valve controlling the passage of hydraulic fluid from the quick-fill chamber back to the supply through the recuperation chamber.

7. The brake assembly of claim 1, further comprising:
    a booster assembly operatively coupled with the master cylinder piston and providing a boost force to the master cylinder piston when the brake pedal is actuated.

8. The brake assembly of claim 7, wherein the booster assembly comprises:
    a boost piston slidably disposed in the respective housing bore;
    the boost piston cooperating with the first diameter of the master cylinder piston to define a recuperation chamber;
    the boost piston cooperating with the at least one housing bore to define a boost chamber operatively communicating with a high pressure supply of hydraulic fluid;
    a boost bore formed in the boost piston;
    a control valve slidably disposed within the boost bore and movable by actuation of the brake pedal between a first position and a second position;
    the first position of the control valve providing fluid communication between the boost bore and the recuperation chamber;
    the second position of the control valve closing off the communication between the boost bore and the recuperation chamber and providing communication between the boost chamber and the boost bore.

9. The brake assembly of claim 8, further comprising a biasing element cooperating with the control valve, the biasing element biasing the control valve within the boost bore toward the first position.

10. A brake assembly with brake elements for stopping the wheels of a vehicle and a supply of hydraulic fluid for the brake assembly, the brake assembly including a master cylinder assembly comprising:
    a housing and at least one housing bore in the housing, the housing bore configured for communication with a supply of hydraulic fluid;

a master cylinder piston slidably disposed in the at least one housing bore and movable by actuation of a brake pedal between an active position and an inactive position;

the master cylinder piston having a first diameter and a second diameter;

a booster assembly operatively coupled with the master cylinder piston and providing a boost force to the master cylinder piston when the brake pedal is actuated;

the booster assembly including:
a boost piston slidably disposed in the respective housing bore;
the boost piston cooperating with the first diameter of the master cylinder piston to define a recuperation chamber;
the boost piston cooperating with the at least one housing bore to define a boost chamber operatively communicating with a high pressure supply of hydraulic fluid;
a boost bore formed in the boost piston;
a control valve slidably disposed within the boost bore and movable by actuation of the brake pedal between a first position and a second position;
the first position of the control valve providing fluid communication between the boost bore and the recuperation chamber;
the second position of the control valve closing off the communication between the boost bore and the recuperation chamber and providing communication between the boost chamber and the boost bore.

11. The brake assembly of claim 10, further comprising a biasing element cooperating with the control valve, the biasing element biasing the control valve within the boost bore toward the first position.

12. The brake assembly of claim 10, further comprising:
the first diameter of the master cylinder piston cooperating with the housing bore to define a variable volume quick-fill chamber,
the second diameter of the master cylinder piston cooperating with the housing bore to define a variable volume master cylinder chamber,
the master cylinder piston including a piston bore communicating with the quick-fill chamber, and a spool slidably disposed within the piston bore,
the spool operable in a first mode to direct hydraulic fluid from the quick-fill chamber to the master cylinder chamber and the brake elements at a first pressure upon initial movement of the master cylinder piston from the inactive position toward the active position for taking up clearance between the brake elements;
the spool operable in a second mode, upon further movement of the master cylinder piston, to direct hydraulic fluid from the quick-fill chamber to the supply of hydraulic fluid when pressure in the master cylinder chamber reaches a predefined threshold;
continued movement of the master cylinder piston toward the active position providing hydraulic fluid to the brake elements at a second pressure higher than the first pressure.

13. The brake assembly of claim 12, further comprising a first check valve and a second check valve cooperating with the spool and directing a flow of hydraulic fluid in the spool between a supply of hydraulic fluid and the master cylinder chamber, the second check valve controlling the passage of hydraulic fluid from the quick-fill chamber to the master cylinder chamber in the first mode, and the first check valve controlling the passage of hydraulic fluid between the quick-fill chamber back and the supply when the master cylinder moves to the inactive position.

14. The brake assembly of claim 12 further comprising a biasing element cooperating with the spool, the biasing element biasing the spool within the piston bore toward a position associated with the first mode of operation.

15. The brake assembly of claim 13, the first check valve controlling the passage of hydraulic fluid from the quick-fill chamber back to the supply through the recuperation chamber.

16. A brake assembly with brake elements for stopping the wheels of a vehicle and a supply of hydraulic fluid for the brake assembly, the brake assembly including a plurality of master cylinder assemblies coupled in a brake assembly housing, each master cylinder assembly comprising:
a housing bore formed in the housing, the housing bore configured for communication with a supply of hydraulic fluid;
a master cylinder piston slidably disposed in the housing bore and movable by actuation of a brake pedal between an active position and an inactive position;
the master cylinder piston having a first diameter and a second diameter;
the first diameter cooperating with the housing bore to define a variable volume quick-fill chamber,
the second diameter cooperating with the housing bore to define a variable volume master cylinder chamber,
a biasing element coupled between the housing bore and the first diameter of the master cylinder piston for biasing the master cylinder piston to the inactive position;
the master cylinder piston including a piston bore communicating with the quick-fill chamber, and a spool slidably disposed within the piston bore,
the spool operable in a first mode to direct hydraulic fluid from the quick-fill chamber to the master cylinder chamber and the brake elements at a first pressure upon initial movement of the master cylinder piston from the inactive position toward the active position for taking up clearance between the brake elements;
the spool operable in a second mode, upon further movement of the master cylinder piston, to direct hydraulic fluid from the quick-fill chamber to the supply of hydraulic fluid when pressure in the master cylinder chamber reaches a predefined threshold;
continued movement of the master cylinder piston toward the active position providing hydraulic fluid to the brake elements at a second pressure higher than the first pressure.

17. The brake assembly of claim 16, further comprising a first check valve and a second check valve cooperating with the spool and directing a flow of hydraulic fluid in the spool between a supply of hydraulic fluid and the master cylinder chamber, the second check valve controlling the passage of hydraulic fluid from the quick-fill chamber to the master cylinder chamber in the first mode, and the first check valve controlling the passage of hydraulic fluid between the quick-fill chamber back and the supply when the master cylinder moves to the inactive position.

18. The brake assembly of claim 16 further comprising a biasing element cooperating with the spool, the biasing element biasing the spool within the piston bore toward a position associated with the first mode of operation.

19. The brake assembly of claim 17, further comprising a recuperation chamber formed in the housing bore and in communication with the supply of hydraulic fluid, the first check valve controlling the passage of hydraulic fluid from the quick-fill chamber back to the supply through the recuperation chamber.

20. The brake assembly of claim 16, further comprising:
a booster assembly operatively coupled with the master cylinder piston and providing a boost force to the master cylinder piston when the brake pedal is actuated, the booster assembly comprising:
a boost piston slidably disposed in the respective housing bore;
the boost piston cooperating with the first diameter of the master cylinder piston to define a recuperation chamber;
the boost piston cooperating with the at least one housing bore to define a boost chamber operatively communicating with a high pressure supply of hydraulic fluid;
a boost bore formed in the boost piston;
a control valve slidably disposed within the boost bore and movable by actuation of the brake pedal between a first position and a second position;
the first position of the control valve providing fluid communication between the boost bore and the recuperation chamber;
the second position of the control valve closing off the communication between the boost bore and the recuperation chamber and providing communication between the boost chamber and the boost bore.

21. A brake assembly with brake elements for stopping the wheels of a vehicle and a supply of hydraulic fluid for the brake assembly, the brake assembly including a plurality of master cylinder assemblies coupled in a brake assembly housing, each master cylinder assembly comprising:
a housing bore formed in the housing, the housing bore configured for communication with a supply of hydraulic fluid;
a master cylinder piston slidably disposed in the housing bore and movable by actuation of a brake pedal between an active position and an inactive position;
the master cylinder piston having a first diameter and a second diameter;
a booster assembly operatively coupled with the master cylinder piston and providing a boost force to the master cylinder piston when the brake pedal is actuated;
the booster assembly including:
a boost piston slidably disposed in the housing bore;
the boost piston cooperating with the first diameter of the master cylinder piston to define a recuperation chamber;
the boost piston cooperating with the at least one housing bore to define a boost chamber operatively communicating with a high pressure supply of hydraulic fluid;
a boost bore formed in the boost piston;
a control valve slidably disposed within the boost bore and movable by actuation of the brake pedal between a first position and a second position;
the first position of the control valve providing fluid communication between the boost bore and the recuperation chamber;
the second position of the control valve closing off the communication between the boost bore and the recuperation chamber and providing communication between the boost chamber and the boost bore.

22. The brake assembly of claim 21, further comprising a biasing element cooperating with the control valve, the biasing element biasing the control valve within the boost bore toward the first position.

23. The brake assembly of claim 21, further comprising:
the first diameter of the master cylinder piston cooperating with the housing bore to define a variable volume quick-fill chamber,
the second diameter of the master cylinder piston cooperating with the housing bore to define a variable volume master cylinder chamber,
the master cylinder piston including a piston bore communicating with the quick-fill chamber, and a spool slidably disposed within the piston bore,
the spool operable in a first mode to direct hydraulic fluid from the quick-fill chamber to the master cylinder chamber and the brake elements at a first pressure upon initial movement of the master cylinder piston from the inactive position toward the active position for taking up clearance between the brake elements;
the spool operable in a second mode, upon further movement of the master cylinder piston, to direct hydraulic fluid from the quick-fill chamber to the supply of hydraulic fluid when pressure in the master cylinder chamber reaches a predefined threshold;
continued movement of the master cylinder piston toward the active position providing hydraulic fluid to the brake elements at a second pressure higher than the first pressure.

24. The brake assembly of claim 21, further comprising a first check valve and a second check valve cooperating with the spool and directing a flow of hydraulic fluid in the spool between a supply of hydraulic fluid and the master cylinder chamber, the second check valve controlling the passage of hydraulic fluid from the quick-fill chamber to the master cylinder chamber in the first mode, and the first check valve controlling the passage of hydraulic fluid between the quick-fill chamber back and the supply when the master cylinder moves to the inactive position.

25. The brake assembly of claim 21 further comprising a biasing element cooperating with the spool, the biasing element biasing the spool within the piston bore toward a position associated with the first mode of operation.

26. The brake assembly of claim 24, the first check valve controlling the passage of hydraulic fluid from the quick-fill chamber back to the supply through the recuperation chamber.

* * * * *